United States Patent

Kurachi

[11] Patent Number: 4,606,564
[45] Date of Patent: Aug. 19, 1986

[54] DEVICE FOR COUPLING HOSE OR THE LIKE

[76] Inventor: Hisaharu Kurachi, 11, Kawasakimachi-2-chome, Chikusa-ku, Nagoya, Japan

[21] Appl. No.: 551,944

[22] Filed: Nov. 15, 1983

[30] Foreign Application Priority Data

Nov. 17, 1982 [JP] Japan ................ 57-200265

[51] Int. Cl.⁴ ............................................. F16L 33/00
[52] U.S. Cl. .................................. 285/248; 285/244; 285/249; 285/318; 285/342; 285/354
[58] Field of Search ............... 285/248, 244, 249, 342, 285/318, 354

[56] References Cited

U.S. PATENT DOCUMENTS 3,167,331  6/1962  Marshall .
3,250,331  5/1966  Boyle .................. 285/318 X
4,223,919  9/1980  Kurachi .

FOREIGN PATENT DOCUMENTS 1147808  4/1963  Fed. Rep. of Germany ...... 285/248
2456678  8/1976  Fed. Rep. of Germany ...... 285/248
960436   6/1964  United Kingdom ............... 285/248

Primary Examiner—Richard J. Scanlan, Jr.
Attorney, Agent, or Firm—Wegner & Bretschneider

[57] ABSTRACT

A hose coupling device comprises a first thrust surface formed on one end of an objective member having a tubular connecting portion to which a hose is to be coupled, the first thrust surface extends radially outwardly around the base portion of the tubular connecting portion; a second thrust surface formed on the end surface of an annular thrusting member adjacent to the objective member, the annular thrusting member being disposed around and coaxially with the tubular connecting portion with an annular gap therebetween and movable axially relatively to the tubular connecting portion, the second thrust surface opposing to the first thrust surface such that the space defined between the thrust surfaces is converged radially outwardly; a radially contractable and expandable annular tightening member contacted at its both sides by the first thrust surface and the second thrust surface, respectively, and disposed coaxially with the tubular connecting portion, the annular tightening member including a circular core wire ring, a plurality of short sleeves having bores loosely receiving the core wire ring, and a plurality of compressive tubular resilient members having bores loosely receiving the core wire ring, the short sleeves and the compressive tubular resilient members being arranged alternatingly along the circumference of the core wire ring so that each compressive tubular resilient member resiliently urges the adjacent short sleeves away from each other; and a driving means for axially driving the annular thrusting member axially towards and away from the objective member.

15 Claims, 14 Drawing Figures

DEVICE FOR COUPLING HOSE OR THE LIKE

BACKGROUND OF THE INVENTION

Field of the Invention

The present invention relates to a device for coupling a hose, tube or the like to a member such as valve, cock or the like.

Hitherto, various types of device have been proposed and used for coupling a hose, tube or the like (referred to simply as "hose", hereinunder) to a member such as a valve, cock or the like (referred to simply as "objective member", hereinunder). One of these known devices employs a plurality of rolling elements such as balls adapted to press radially inwardly the hose end fitting around a tubular portion of the objective member so as to cause a plastic deformation of the hose thereby to fix and couple the hose to the objective member. This type of coupling device, however, encounters the following problems. Namely, it is rather difficult to effect stable fastening and smooth disconnection of the hose to and from the objective member. In addition, a cage holding the rolling elements tends to be distorted or damaged during repeated use to disable the device to effect a uniform tightening of the hose onto the objective member.

SUMMARY OF THE INVENTION

Accordingly, an object of the invention is to provide a device for fastening and fixing hoses of various sizes and materials, e.g. rubber hoses for household use, high-pressure hoses of large diameters, polyethylene pipes, plastic tubes and so forth, to an objective member such as a valve, cock or the like uniformly and reliably by a simple operation, thereby to overcome the above-described problems of the prior art.

To this end, according to an aspect of the invention, there is provided a hose coupling device comprising: a first thrust surface formed on one end of an objective member having a tubular connecting portion to which a hose is to be coupled, the first thrust surface extending radially outwardly around the base portion of the tubular connecting portion; a second thrust surface formed on the end surface of an annular thrusting member adjacent to the objective member, the annular thrusting member being disposed around and coaxialy with the tubular connecting portion with an annular gap therebetween and movable axially relatively to the tubular connecting portion, the second thrust surface opposing to the first thrust surface such that the space defined between the thrust surface is converged radially outwardly; a radially contractable and expandable annular tightening member contacted at its both sides by the first thrust surface and the second thrust surface, respectively, and disposed coaxially with the tubular connecting portion, the annular tightening member including a circular core wire ring, a plurality of short sleeves having bores loosely receiving the core wire ring, and a plurality of compressive tubular resilient members having bores loosely receiving the core wire ring, the short sleeves and the compressive tubular resilient members being arranged alternatingly along the circumference of the core wire ring so that each compressive tubular resilient member resiliently urges the adjacent short sleeves away from each other; and a driving means for driving the annular thrusting member axially towards and away from the objective member; whereby, when the annular thrusting member is driven by the driving means towards the objective member, the short sleeves of the annular tightening member are clamped between the thrust surfaces and urged radially inwardly, thereby to fasten and tighten strongly the hose around the tubular connecting portion of the objective member.

Other objects, features and advantages of the invention will become clear from the following description of the preferred embodiments taken in conjunction with the accompanying drawings.

DESCRIPTION OF THE PREFERRED EMBODIMENTS

Figure 1:
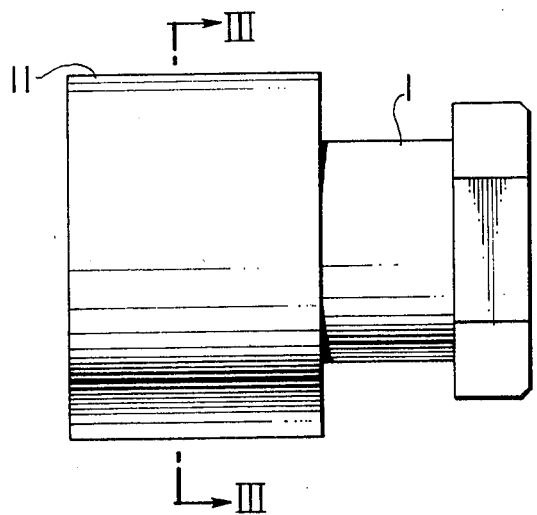
FIG. 1 is a side elevational view of a first embodiment.

Referring first to FIGS. 1 through 6 showing a first embodiment of the invention, an objective member 1 to which a hose is to be coupled by means of a device of the invention is provided with an outer peripheral flange 3 having a flat thrust surface 3a. The flange 3 is externally threaded as at 3b. The objective member 1 is provided also with a tubular connecting portion 2 projecting axially forwardly from the central portion thereof. The flat thrust surface 3a is annularly recessed at its portion around the base portion of the tubular connecting portion 2 so as to provide an annular groove 3c for receiving the end of the hose which is designated at a numeral 12. The objective member 1 which is diagrammatically shown in these Figures may be any type of members such as valves and cocks including water faucet, pipes, pipe joints and so forth.

Figure 2:
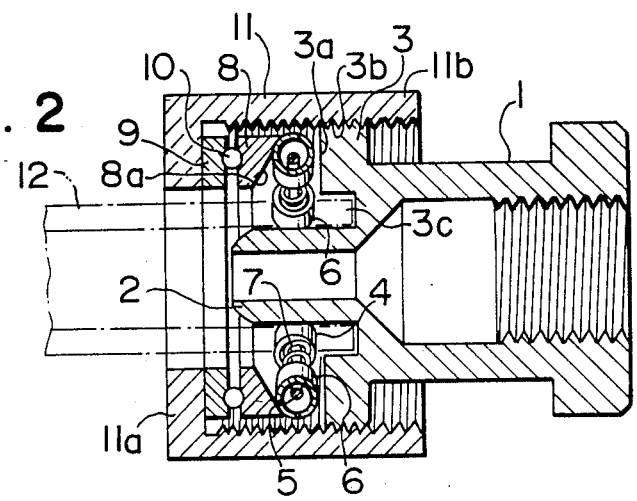
FIG. 2 is a sectional side elevational view of the first embodiment.
Figure 3:
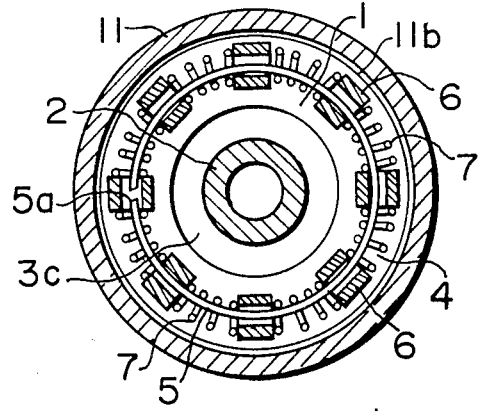
FIG. 3 is a sectional view taken along the line III—III of FIG. 1.
Figure 5:
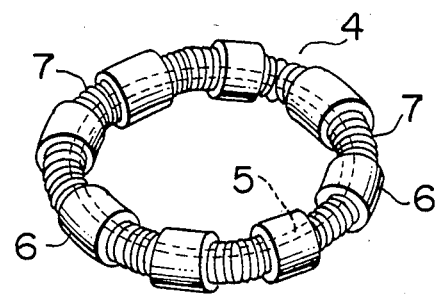
FIG. 5 is a perspective view of an annular tightening member.
Figures 7A, 7B, 7C:
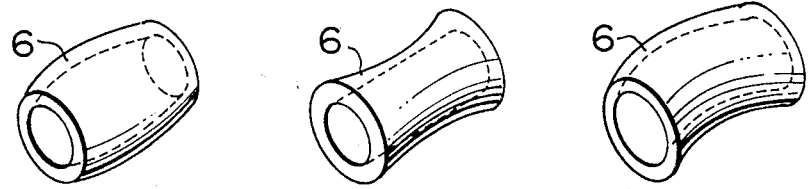
FIGS. 7a, 7b and 7c are perspective views of different examples of short sleeves.
Figure 8:
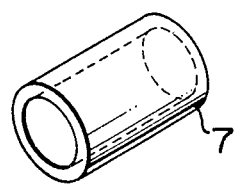
FIG. 8 is a perspective view of another example of a compressive cylindrical resilient member.
Figure 11A:
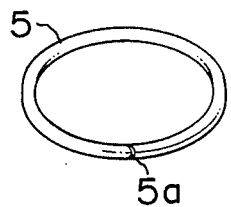
FIGS. 11a and 11b are perspective views of different examples of core wire rings.
Figure 11B:
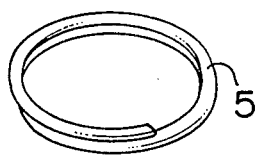

As will be best seen from FIG. 5, a radially expandable and contractable annular tightening member 4 is composed of a circular core wire ring 5 on which alternatingly and losely mounted are short sleeves 6 and compressive tubular resilient members 7. FIGS. 11a and 11b show examples of the core wire ring 5. More specifically, FIG. 11a shows an example in which the core wire ring 5 is cut at its intermediate portion 5a, while the core wire ring 5 shown in FIG. 11b is constituted by a doubly wound wire. For assembling the annular tightening member 4, the short sleeves 6 and the compressive tubular resilient members 7, which are in this case coiled compression springs, are fitted alternatingly around the core wire ring 5 through the cut out 5a when the core wire ring 5 shown in FIG. 11a is used, whereas, when the core wire ring 5 shown in FIG. 11b is used, the short sleeves 6 and the compressive tubular resilient members are fitted from one end of the continuous wire. In the assembled state of the annular tightening member, the compressive tubular resilient members 7 produce a resilient force which urge the short sleeves 6, as well as the members 7 themselves, radially outwardly to make the short sleeves 6 be pressed at radially inner portions of their bore walls to the core wire ring 5, so that the short sleeves 6 and the compressive tubular resilient members 7 in combination constitute a circular form of the annular tightening member 4 as shown in FIGS. 2, 3 and 5. It will be understood that this annular tightening member 4 can be contracted radially inwardly while compressing resilient members 7 and expanded radially outwardly to the original state by resetting force of the resilient members 7. Needless to say, the short sleeves 6 and the compressive tubular resilient member can move radially inwardly and outwardly with respect to the core wire ring 5 for the contraction and expansion of the annular tightening member. Although the first embodiment employs cylindrical straight short sleeves 6, the short sleeves may have other suitable shapes such as a barrel-shape with expanded intermediate portion as shown in FIG. 7a, a form with a contracted intermediate portion as shown in FIG. 7b and a curvilinear cylinderical form as shown in FIG. 7c. It is also possible to use a cylindrical compressive member made of resilient material, such as rubber, shown in FIG. 8 in place of the coiled spring as the compressive tubular resilient member 7. Preferably, the short sleeve 6 has high strength and hardness.

The hose coupling device of the invention further has an annular thrusting member 8 which has a conical surface constituting a thrust surface 8a adapted to contact the other side of the annular tightening member 4. A multiplicity of steel balls 10 are interposed between the annular thrusting member 8 and a seat race member 9 so that the annular thrusting member can rotate relatively to the seat race member 9. Thus, the annular thrusting member 8, steel balls 10 and the seat race member 9 in cooperation constitute a kind of thrust bearing. The hose coupling device further has an outer sleeve 11 having an internal screw thread 11b for engagement with the external thread 3b on the flange 3 of the objective member 1. The outer sleeve 11 is provided with an inner flange 11a at its base end portion.

For assembling the hose coupling device of this embodiment, the thrust bearing constituted by the seat race member 9, steel balls 10 and the annular thrusting member 8 is placed in the outer sleeve 11 and then the annular tightening member 4 is placed in the same.

Figure 4:
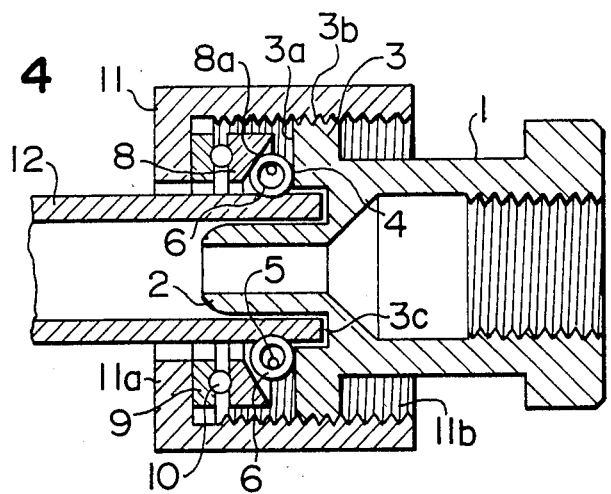
FIG. 4 is a sectional side elevational view of the first embodiment in the state of use.
Figure 6:
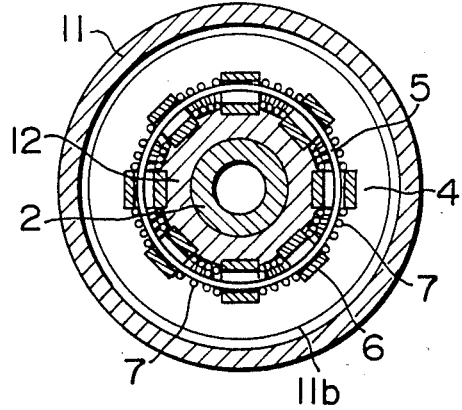
FIG. 6 is a sectional front elevational view of the first embodiment in the state of use.

In operation, the hose 12 to be coupled to the objective member 1 is fitted at its end on the tubular connecting portion 2 of the objective member until the hose end is received by the annular groove 3c, through the bore in the inner flange 11a of the outer sleeve 11 and through the bores in the annular thrusting member 8 and the annular tightening member 4, as shown by chain line in FIG. 2. Subsequently, the outer sleeve 11 is screwed onto the objective member 1 through the screwing engagement between the threads 3b and 11b until one side surface of the annular tightening member 4 contacts the flat thrust surface 3a of the objective number 1 as shown in FIG. 2. Then, as the outer sleeve 11 is further screwed to receive the objective member 1 deeper, the conical thrust surface 8a makes a wedging action on the annular tightening member 4 as a result of the axial movement of the annular thrusting member 8, so that the short sleeves 6 are moved radially inwardly. In consequence, the hose 12 is tightened and fastened strongly onto the tubular connecting portion 2 of the objective member 1 by the contracting action of the annular tightening member 4 as shown in FIGS. 4 and 6.

For disconnecting the hose 12, the annular thrusting member 8 is relieved from the axial thrusting force to allow the annular fastening member 4 to expand by the resetting force produced by the compressive tubular resilient members 7, simply by unscrewing of the outer sleeve 11, as shown in FIGS. 1 to 3. In this state, the hose 12 is freed from the tightening force so that it can be withdrawn from the tubular connecting portion 2 of the objective member 1.

Figure 9:
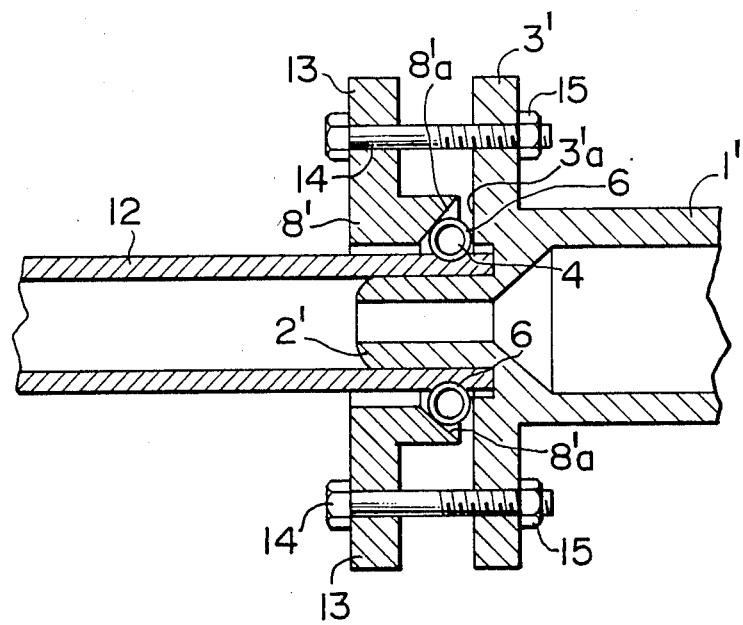
FIG. 9 is a sectional side elevational view of a second embodiment.

FIG. 9 shows a second embodiment of the hose coupling device of the invention.

In this second embodiment, the objective member 1' has a flange 3' of a substantial radial length, while an annular thrusting member 8' provided with a conical thrust surface 8'a has a flange 13 of a radial length substantially corresponding to that of the flange 3'. In operation, the hose 12 is fitted to the tubular connecting portion 2' of the objective member 1' through the annular thrusting member 8' and the annular tightening member 4 as in the first embodiment. Then, the annular thrusting member 8' is forcibly urged towards the objective member 1 as nuts 15 are screwed deeper to a plurality of bolts 14 which are passed through bolt holes formed in the flange 13 of the annular pressing member 8 and the flange 3' of the objective member 1. Consequently, the annular tightening member 4 is forcibly contracted radially inwardly by the wedging action of the conical thrust surface 8'a of the annular thrusting member 8, thereby to tighten and fasten the hose 12 onto the tubular connecting portion 2' of the objective member 1'.

Figure 10:
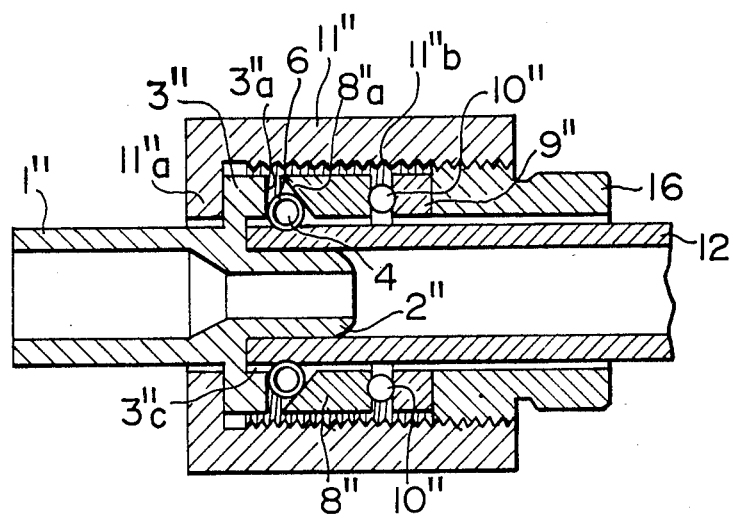
FIG. 10 is a sectional side elevational view of a third embodiment.

FIG. 10 shows a third embodiment of the hose coupling device of the invention. In this embodiment, an objective member 1" has a flange 3" which is inserted into an outer sleeve 11" through a bore formed in a flange 11"a of the outer sleeve 11". The annular tightening member 4 is adapted to contact at its one side with the thrust surface 3"a of the objective member 1". An annular thrusting member 8" has a conical thrust surface 8"a adapted to contact with the other side of the annular tightening member 4. The annular thrusting member 8", a plurality of steel balls 10" and a seat race member 9" are received by the outer sleeve 11" so as to form a kind of thrust bearing. A screw cylinder 16 is screwed into the outer sleeve 11". In operation, the hose 12 is fitted onto the tubular connecting portion 2" of the objective member 1" through the screw sleeve 16, the seat race 9", the annular thrusting member 8" and the annular tightening member 4. Then, the screw cylinder 16 is screwed deeper into the outer sleeve 11" to enforce the annular thrusting member 8" to move axially so that the conical thrust surface 8"a causes an wedging action on the annular tightening member 4 thereby to tighten and fasten the hose end onto the tubular connecting portion 2" of the objective member 1".

As has been described, the hose coupling device of the invention has a radially contractable and expandable annular tightening member composed of a core wire ring on which loosely and alternatingly mounted are compressive tubular resilient members and short sleeves, an objective member having a flat thrust surface adapted to be contacted by one side of the annular tightening member, and an annular thrusting member having a conical thrust surface for contact with the other side of the annular tightening member. The hose fitted on the objective member is tightened and fastened by radially inward force exerted by the tubular fastening member due to the wedging action of the conical thrust sufface of the annular thrusting member as a result of an axial movement of the latter towards the objective member. Therefore, unstability or looseness of hose on the objective member, often experienced with the conventional hose coupling device, is eliminated advantageously.

In addition, since the short sleeves of the annular tightening member are equally moved radially inwardly to embrace and tighten the hose uniformly, it is possible to fasten the hose uniformly, strongly and securely. Furthermore, in the annular fastening member employed by the hose coupling device of the invention, the distance between adjacent short sleeves, which are spaced from each other by the compressive tubular resilient member, can be increased and decreased freely over a wide range so that the hose coupling device of the invention can have a wide adaptability to various wall thicknesses, outside diameters and materials of the hoses, while assuring uniform and close fit of the hose on the objective member without encountering any local resistance. It is also to be noted that the hose coupling device of the invention permits an easy disconnection of the hose through relieving the radially inward tightening force, without causing any damage on the hose. The hose coupling device of the invention having simple and rigid construction can stand repetitional use while exhibiting constant hose coupling performance, without suffering from any deterioration of the tightening function.

Although the invention has been described through specific terms, it is to be understood that the described embodiment is not exclusive and various changes and modifications may be imparted thereto. For instance, although in the described embodiments the conical thrust surface, is formed on the thrusting member while the flat thrust surface is formed on the objective member, it is possible to make the thrusting member and the objective member have a flat thrust surface and a conical thrust surface, respectively, or even to make both of them have conical thrust surfaces. Other changes and modifications are still possible without departing from the scope of the invention which is limited solely by the appended claims.

What is claimed is:

1. A hose coupling device comprising:
    a first thrust surface formed on one end of an objective member having a tubular connecting portion to which a hose is to be coupled, said first thrust surface extending radially outwardly around the base portion of said tubular connecting portion;
    a second thrust surface formed on the end surface of an annular thrusting member adjacent to said objective member, said annular thrusting member being disposed around and coaxially with said tubular connecting portion with an annular gap therebetween and movable axially relative to said tubular connecting portion, said second thrust surface opposing said first thrust surface such that the space defined between said first and second thrust surfaces is converged radially outwardly;
    a radially contractable and expandable annular tightening member contacted at its both sides by said first thrust surface and said second thrust surface, respectively, and disposed coaxially with said tubular connecting portion, said annular tightening member including a non-expandable circular core wire ring, a plurality of short sleeves having bores loosely receiving said core wire ring so that said short sleeves may be moved radially inwardly and outwardly with respect to the core wire, and a plurality of compressive tubular resilient members having bores loosely receiving said core wire ring so that said resilient member may be moved radially inwardly and outwardly with respect to the core wire, said short sleeves and said compressive tubular resilient members being arranged alternately along the circumference of said core wire ring so that each compressive tubular resilient member resiliently urges the adjacent short sleeves away from each other; and
    a driving means for driving said annular thrusting member axially towards and away from said objective member;
    whereby, when said annular thrusting member is driven by said driving means towards said objective member, said short sleeves of said annular tightening member are clamped between said thrust surfaces and urged radially inwardly, thereby to fasten and tighten strongly said hose around said tubular connecting portion of said objective member.

2. A hose coupling device according to claim 1 wherein each of said short sleeves of said annular tightening member has a straight cylindrical form.

3. A hose coupling device according to claim 1 wherein each of said short sleeves of said annular tightening member has a cylindrical form with radially outwardly expanded intermediate portion.

4. A hose coupling device according to claim 1 wherein each of said short sleeves of said annular tightening member has a cylindrical form with radially inwardly contracted intermediate portion.

5. A hose coupling device according to claim 1 wherein each of said short sleeves of said annular tightening member has a curvilinear cylindrical form.

6. A hose coupling device according to claim 1 wherein each of said compressive tubular resilient members of said annular tightening member is a compression spring.

7. A hose coupling device according to claim 1 wherein each of said compressive tubular resilient members of said annular tightening member is a cylindrical member made of rubber.

8. A hose coupling device comprising:
    a first thrust surface formed on one end of an objective member having a tubular connecting portion to which a hose is to be coupled, said first thrust surface extending radially outwardly around the base portion of said tubular connecting portion;
    a second thrust surface formed on the end surface of an annular thrusting member adjacent to said objective member, said annular thrusting member being disposed around and coaxially with said tubular connecting portion with an annular gap therebetween and movable axially relative to said tubular connecting portion, said second thrust surface opposing said first thrust surface such that the space defined between said first and second thrust surfaces is converged radially outwardly;

a radially contractable and expandable annular tightening member contacted at its both sides by said first thrust surface and said second thrust surface, respectively, and disposed coaxially with said tubular connecting portion, said annular tightening member including a circular core wire ring, a plurality of short sleeves having bores loosely receiving said core wire ring, and a plurality of compressive tubular resilient members having bores loosely receiving said core wire ring, said short sleeves and said compressive tubular resilient members being arranged alternately along the circumference of said core wire ring so that each compressive tubular resilient member resiliently urges the adjacent short sleeves away from each other; and a driving means for driving said annular thrusting member axially towards and away from said objective member comprising an external screw thread formed on the periphery of an annular flange formed on said objective member so as to extend radially outwardly from the base portion of said tubular connecting portion substantially at a right angle to the axis of said tubular connecting portion, said annular flange having an axially outer surface constituting said first thrust surface; and an outer sleeve having an internal thread for engagement with the external thread on said flange of said objective member and having a flange extending radially inwardly from the outer end thereof, said annular thrusting member having a conical end surface constituting said second thrust surface, while the other end of said annular thrusting member is pressed against said flange of said outer sleeve through a thrust bearing;

whereby, when said annular thrusting member is driven by said driving means towards said objective member, said short sleeves of said annular tightening member are clamped between said thrust surfaces and urged radially inwardly, thereby to fasten and tighten strongly said hose around said tubular connecting portion of said objective member.

9. A hose coupling device according to claim 1, wherein said objective member is formed with a radially outwardly extending annular flange on which said first thrust surface is formed, said annular thrusting member has a conical end surface forming said second thrust surface confronting said first thrust surface; said driving means comprises:

a thrust bearing unit provided on the side opposite to the conical second thrust surface of said annular thrusting member for supporting said thrusting member against backward movement thereof;

a rotatable outer sleeve coaxially surrounding said outwardly extending annular flange of the objective member, said annular thrusting member, and said thrust bearing unit, said outer sleeve being intervally threated to provide a lead screw; and means in engagement with said lead screw of the outer sleeve for axially urging said thrust bearing unit towards said outwardly extending annular flange of the objective member.

10. A hose coupling device according to claim 9, wherein each of said short sleeves of said annular tightening member has a straight cylindrical form.

11. A hose coupling device according to claim 9, wherein each of said short sleeves of said annular tightening member has a cylindrical form with radially outwardly expanded intermediate portion.

12. A hose coupling device according to claim 9, wherein each of said short sleeves of said annular tightening member has a cylindrical form with radially inwardly contracted intermediate portion.

13. A hose coupling device according 9, claim 8, wherein each of said short sleeves of said annular tightening member has a curvilinear cylindrical form.

14. A hose coupling device according to claim 9, wherein each of said compressive tubular resilient members of said annular tightening member is a compression spring.

15. A hose coupling device according to claim 9, wherein each of said compressive tubular resilient members of said annular tightening member is a cylindrical member made of rubber.

* * * * *